Dec. 18, 1951   R. J. FLYNN   2,579,377
ARTIFICIAL BAIT
Filed March 15, 1948
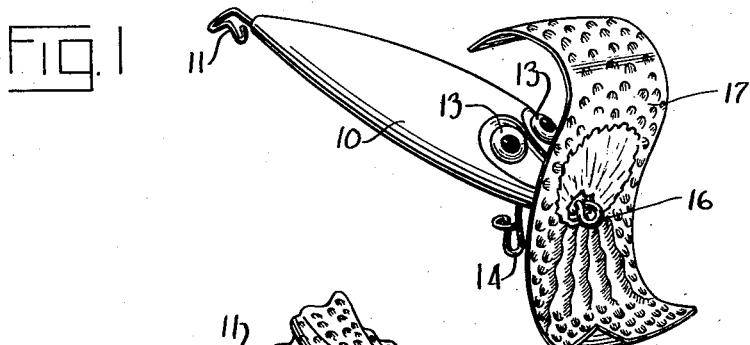
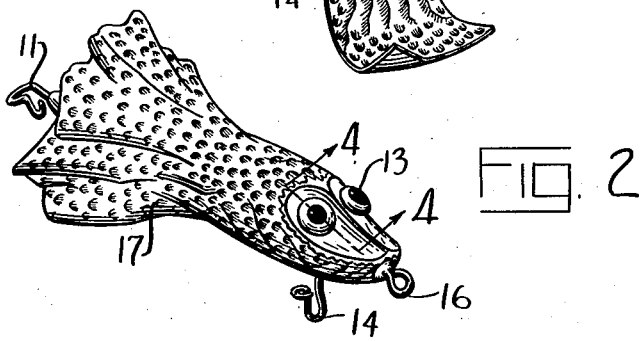
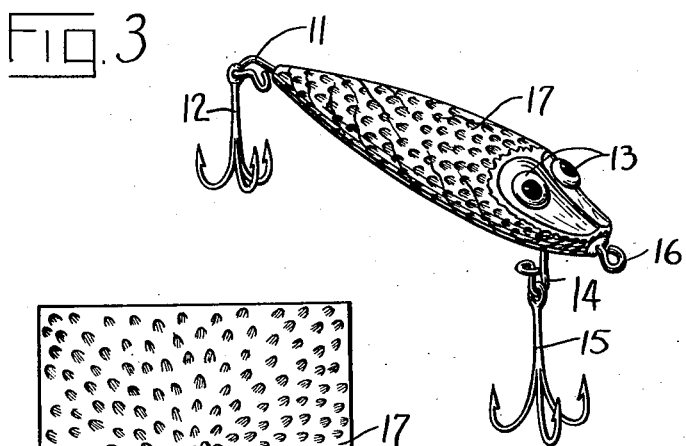
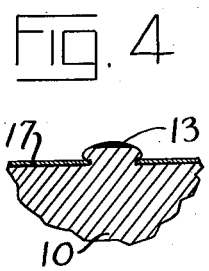
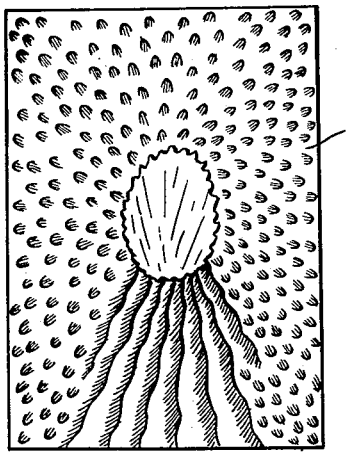
INVENTOR
RICHARD J. FLYNN
BY G. H. Braddock
ATTORNEY Patented Dec. 18, 1951

2,579,377

UNITED STATES PATENT OFFICE 2,579,377

ARTIFICIAL BAIT

Richard J. Flynn, St. Paul, Minn.

Application March 15, 1948, Serial No. 14,939

1 Claim. (Cl. 43—42.09)

This invention has relation to an artificial bait of the kind which consists of a plug constituting a body member of the artificial bait and a removable cover upon the plug. It is well known to fishermen that the appearance of artificial bait is an important factor in successful fishing, and fish lures of the kind herein presented are popular for the reason that the appearance of the fish lures can be altered at will by replacing the removable covers. A fisherman need purchase and transport but a single plug body member and yet be able to employ, by selective utilization of removable covers upon the plug body member which are, individually, colored or otherwise marked in various manners, fish lures which vary greatly in appearance and are adapted to suit different situations calculated to produce successful fishing results.

An object of the invention is to provide an artificial bait consisting of a plug body member and a removable cover upon said body member which will be of novel and improved construction.

A further object is to provide an artificial bait consisting of a plug or core and a removable cover of pliable material in sheet or leaf form adapted to be applied to said plug or core in new and improved manner.

And a further object is to provide a fish lure consisting of a plug or core constituting a solid body member of the fish lure and a sheet or leaf of pliable material, such, for example, as tin foil, adapted to be manually applied to the plug or core and made to lie in contiguous relation thereto thus to constitute a removable cover upon said plug or core.

In the accompanying drawing forming a part of this specification,

Fig. 1 is a perspective view of an artificial bait incorporating features and characteristics of the present invention as when a removable cover of the artificial bait is being assembled with a plug or core of said artificial bait during an initial stage of the assembling operation;

Fig. 2 is a view corresponding generally with the disclosure of Fig. 1, but disclosing the artificial bait as when the removable cover is being applied to the plug or core during a later stage of the assembling operation;

Fig. 3 is a perspective view of the artificial bait as when ready for use;

Fig. 4 is a detail sectional view, taken on line 4—4 in Fig. 2; and

Fig. 5 is a plan view of the cover of the artificial bait disclosed in Figs. 1 to 3.

A plug or core 10 of the artificial bait may be of any preferred character. As disclosed, said plug or core is of elongated, curvilinear configuration. The rear end portion of the plug or core tapers rearwardly and the rear end supports a hook 11 for detachably receiving the shank 12 of a first fish hook. The front end portion of said plug or core tapers forwardly. Fish eyes upon an upper part of said front end portion are denoted 13, 13, and a hook 14 upon a lower part of the front end portion, opposite the fish eyes 13, 13, is for detachably receiving the shank 15 of a second fish hook. The fish hooks detachably supported by the hooks 11 and 14 can each include any number of barbs. As shown, each fish hook includes three barbs. An eye 16, secured to the front end of the plug or core, is for attachment of a fishing line. The construction and arrangement will be such that the fish hook shanks 12 and 15 can be readily and easily detached from the hooks 11 and 14.

A removable cover for the plug or core 10 is represented 17. As disclosed, said removable cover is of rectilinear configuration. It could, however, be of different shape. The removable cover 17 is constituted as a sheet or leaf of pliable material, such, for example, as tin foil. It is contemplated that there will be available for use with each plug or core such as 10 a number of differently colored or otherwise marked removable covers such as 17, so that a user of the artificial bait can selectively employ any one of the removable covers he may prefer.

The cover 17 will be applied to and removed from the plug or core 10 while the eye 16 is detached from the fish line and the shanks 12 and 15 are detached from the hooks 11 and 14, as in Figs. 1 and 2 of the drawings.

In Fig. 1 the removable cover 17 is disclosed as when being assembled with the plug or core 10 during an initial stage of the assembling operation. The eye 16 has been made to pierce an intermediate part of the removable cover at the lower side of a section of said removable cover to be situated over the fish eyes 13, 13.

In Fig. 2 the removable cover is shown as when being applied to the plug or core during a later stage of the assembling operation. The portions of the sheet or leaf of pliable material adjacent its midportions have been manually pressed down upon and shaped to the forward end portion of said plug or core. During a stage of the assembly after the sheet or leaf was pierced by the eye 16 and before said sheet or leaf was situated as in Fig. 2, the hook 14 was made to pierce the sheet or leaf.

In Fig. 3 the artificial bait is disclosed as when ready for use. The sheet or leaf of pliable material has been manually pressed down upon and shaped to the whole of the plug or core and the fish hook shanks 12 and 15 have been replaced. And, too, portions of said sheet or leaf which became situated over the fish eyes 13, 13 are shown in both Figs. 2 and 3 as having been removed. Removal of these mentioned portions can be quite easily accomplished simply by running the fingernail around and beneath the fish eyes.

The pressing down and shaping operation performed upon the pliable sheet or leaf of course will be accompanied by crumpling action upon the material of the removable cover causing it to become stably fitted to the plug or core. The general appearance of the artificial bait when ready for use will be about as disclosed in Fig. 3.

It will be obvious that the cover 17 can be quite easily torn off of the plug or core 10. It is contemplated that when a cover is removed it will be discarded.

What is claimed is:

An artificial bait comprising an elongated body including raised elements in simulation of fish eyes on a forward portion thereof, a closed loop constituting an eye secured to the front end of said body, a first hook secured to the forward portion and a second hook at a rear end thereof and a removable cover constituted as a strip of pliable, tractable material crumpled down against, shaped to and enclosing said body and extending continuously from a rear end along an upper surface of the body to and around a front end thereof with a central portion of the strip enclosing said front end and along a lower surface of said body to said rear end; and said raised elements, closed loop and first hook projecting through said removable cover.

RICHARD J. FLYNN.

REFERENCES CITED

The following references are of record in the file of this patent:

UNITED STATES PATENTS

| Number | Name | Date |
|---|---|---|
| 727,173 | Merrell | May 5, 1903 |
| 1,611,117 | Kearns | Dec. 14, 1926 |
| 1,740,335 | Cowan | Dec. 17, 1929 |
| 2,224,504 | Milmoe | May 13, 1935 |